United States Patent [19]

Panton

[11] Patent Number: 5,519,527
[45] Date of Patent: May 21, 1996

[54] MODEM FOR COMMUNICATING WITH ENCLOSED ELECTRONIC EQUIPMENT

[75] Inventor: Stanley Panton, Ontario, Canada

[73] Assignee: Milltronics Ltd., Peterborough, Canada

[21] Appl. No.: 158,880

[22] Filed: Nov. 29, 1993

Related U.S. Application Data

[63] Continuation-in-part of Ser. No. 914,531, Jul. 17, 1992, abandoned.

[30] Foreign Application Priority Data

Jul. 16, 1993 [WO] WIPO .................... PCT/CA93/00295

[51] Int. Cl.⁶ .......................... H04B 10/10; H04B 10/24
[52] U.S. Cl. ...................... 359/159; 359/143; 359/163; 359/162
[58] Field of Search ..................... 359/159, 163, 359/179, 171, 168, 162, 143

[56] References Cited

U.S. PATENT DOCUMENTS 5,387,994  2/1994  McCormack ........................ 359/159

FOREIGN PATENT DOCUMENTS

| | | | |
|---|---|---|---|
| 0334254 | 9/1989 | European Pat. Off. | 359/159 |
| 0484912 | 5/1992 | European Pat. Off. | 359/159 |
| 3232015 | 3/1984 | Germany . | |
| 0185131 | 7/1986 | Japan | 359/163 |
| 0258129 | 10/1988 | Japan | 359/159 |
| 0207131 | 9/1991 | Japan | 359/159 |
| 4334136 | 11/1992 | Japan | 359/159 |

*Primary Examiner*—Leslie Pascal
*Attorney, Agent, or Firm*—Ridout & Maybee

[57] ABSTRACT

A portable interface unit incorporates a modem for connecting a personal computer through a bidirectional communication link to enclosed process control equipment by passing radiation, preferably infra-red radiation, through a casing enclosing the unit. The computer has a bidirectional digital serial interface specified in accordance with an industry standard, and the modem has a complementary bidirectional digital serial interface, an optical modulator and an optical demodulator, and a power supply. The power supply can be a circuit to derive power from the serial interface of the personal computer, or from a battery. The portable interface unit provides a versatile bidirectional communications link which is particularly suitable for use in hazardous environments and with electronic equipment designed to be environmentally sealed or tamperproof, and permits general purpose computers to be used to program, diagnose, configure or interrogate such equipment.

8 Claims, 5 Drawing Sheets

MODEM FOR COMMUNICATING WITH ENCLOSED ELECTRONIC EQUIPMENT

REFERENCE TO RELATED APPLICATION

This application is a continuation-in-part of my application Ser. No. 07/914,531 filed Jul. 17, 1992, now abandoned.

FIELD OF THE INVENTION

This invention relates to a portable interface unit or modem which permits temporary bidirectional communication between enclosed electronic process control equipment and a general purpose personal computer, without electrical connection between the two.

BACKGROUND OF THE INVENTION

Radiation transducers are frequently used to provide a communications link between two or more devices in conditions where the devices are required to be electrically isolated or where a standard electrical connection would be unsuitable.

Radiation transducers can function as a communications link between two devices in the following ways: unidirectionally, also known as simplex communication; and bidirectionally in both directions, known as duplex communication.

An example of an application of radiation transducers in a simplex communication system for providing temporary communication between enclosed electronic equipment and a separable control unit is disclosed in U.S. Pat. No. 4,821,215, S. J. Woodward, issued on Apr. 11, 1989 and assigned to the assignee of the present application. The specification of the Woodward patent is incorporated herein by reference. The Woodward patent relates to monitoring equipment for use in adverse or hazardous environments. The Woodward patent discloses a portable dumb keypad equipped with an infrared transmitter for use in communicating with monitoring equipment equipped with an infrared receiver and a display.

In the Woodward patent, simplex communication takes place between the dumb keypad and the process control equipment when the keypad is docked in a recess in the case of the process control equipment. The dumb keypad allows the operator to control and change various parameters of the monitoring device. The monitoring device, on the other hand, is incapable of communicating with the keypad. The keypad is used to retrieve data from the memory of the monitoring unit by means of the display. This technique of retrieving data may be impractical in certain circumstances, particularly when a significant amount of data has been stored by the unit over an extended period of time. Furthermore, it may be impractical, except in the simplest of cases, to use the dumb keypad to program or reprogram the monitoring unit, especially when a plurality of monitoring units must be identically programmed or reprogrammed.

Systems in which bidirectional communication is used between two electrooptically linked devices, each equipped with a transceiver, are disclosed in U.S. Pat. No. 3,503,061, T. E. Bray et al., issued on Mar. 24, 1970 and U.S. Pat. No. 4,119,948, E. M. Ward et al., issued on Oct. 10, 1978.

Communications links, such as electromagnetic, ultrasonic and infrared links, are increasingly being used in a number of applications for monitoring and reprogramming electronically controlled equipment in sealed or tamperproof enclosures. The physical structure of the actual radiation link may take many forms, but in general each type of equipment, or even the same type of equipment from different manufactures, forming one end of such a link requires a customized monitoring and/or programming unit providing the other portion of the link. Such specialized units are expensive, and may not provide for functions such as diagnosis and repair of malfunctioning units, or field testing of units under development. Depending on the application, it may also be necessary to protect the unit against adverse environments, and to ensure that it is intrinsically safe for use in hazardous environments. Such a unit is the Series 847 Portable ENRAF Terminal (PET) available from Enraf-Nonius and adapted to interface through an optical fibre link with gauges manufactured by that company. Such a weatherproof and intrinsically safe product is necessarily expensive to produce, yet is useful only for its own limited purposes. A field engineer on the other hand may need to deal with many types of equipment, and may need facilities beyond those provided by a specialized terminal of this nature.

To enable personal and other computers and controllers having general purpose serial communications ports to communicate with other devices over various types of data links, they are normally used with modems, which convert the serial data to and from a form suitable for communication over the type of data link to be utilized, and provide an interface to and from that data link.

SUMMARY OF THE INVENTION

The present invention provides a modem which permits a personal computer to access data stored in enclosed electronic equipment without electrical connection to the equipment, and to download the data to the computer. The invention also permits the computer to access the internal programming of the enclosed electronic equipment and to program or reprogram the equipment, or transfer data to it, assuming that the equipment has provision for duplex communication by radiation of energy through its casing.

In most circumstances, it is desirable that a process control unit, or electronic equipment in general, be protected against tampering by unauthorized users. Electronic equipment possessing conventional external data transfer facilities are subject to tampering. The modem of the present invention creates a temporary communications link between the interface unit and enclosed electronic equipment which does not require an electrical connection. Therefore, the electronic equipment is not required to possess conventional external data transfer facilities and is, accordingly, tamper resistant.

The present invention also provides for a non-electrical coupling between the enclosed electronic equipment and the modem in which there is no potential risk of creating an electric spark or spark discharge. This spark free connection is particularly suitable for applications in highly flammable and explosive environments.

The modem enables bidirectional communication between a personal computer and enclosed electronic equipment. A standardized serial interface is used to connect the interface unit to the computer. Radiation transceivers are used to establish the portion of the communications link between the interface unit and the enclosed electronic equipment. The present invention, in another aspect, is directed to a portable interface unit having a part which may be docked and releasably retained on enclosed electronic equipment having suitable docking means.

In order to provide a more versatile and economical interface, we provide an interface unit or modem capable of providing bidirectional communication and having, on the one hand a radiation interface for use in a radiation coupling relationship with a radiation interface of a sealed or tamperproof electronic unit, and, on the other hand an industry standard serial digital interface. This enables a general purpose personal computer, such as a lap-top or other portable computer, equipped with suitable programs and data storage capacity, to be linked conveniently to environmentally sealed or tamperproofed electronic equipment to be monitored via an optical interface. The unit may be battery powered, or, alternatively, may draw power from the host computer if sufficient power to operate the radiation link is within the specifications of the interface, which will usually be nominally in accordance with the requirements of the current version of the RS232 standard, or any other widely supported serial interface.

These and further features of the invention are set forth in the appended claims and will be described further with reference to the accompanying drawings.

DESCRIPTION OF THE PREFERRED EMBODIMENTS

Figure 1:
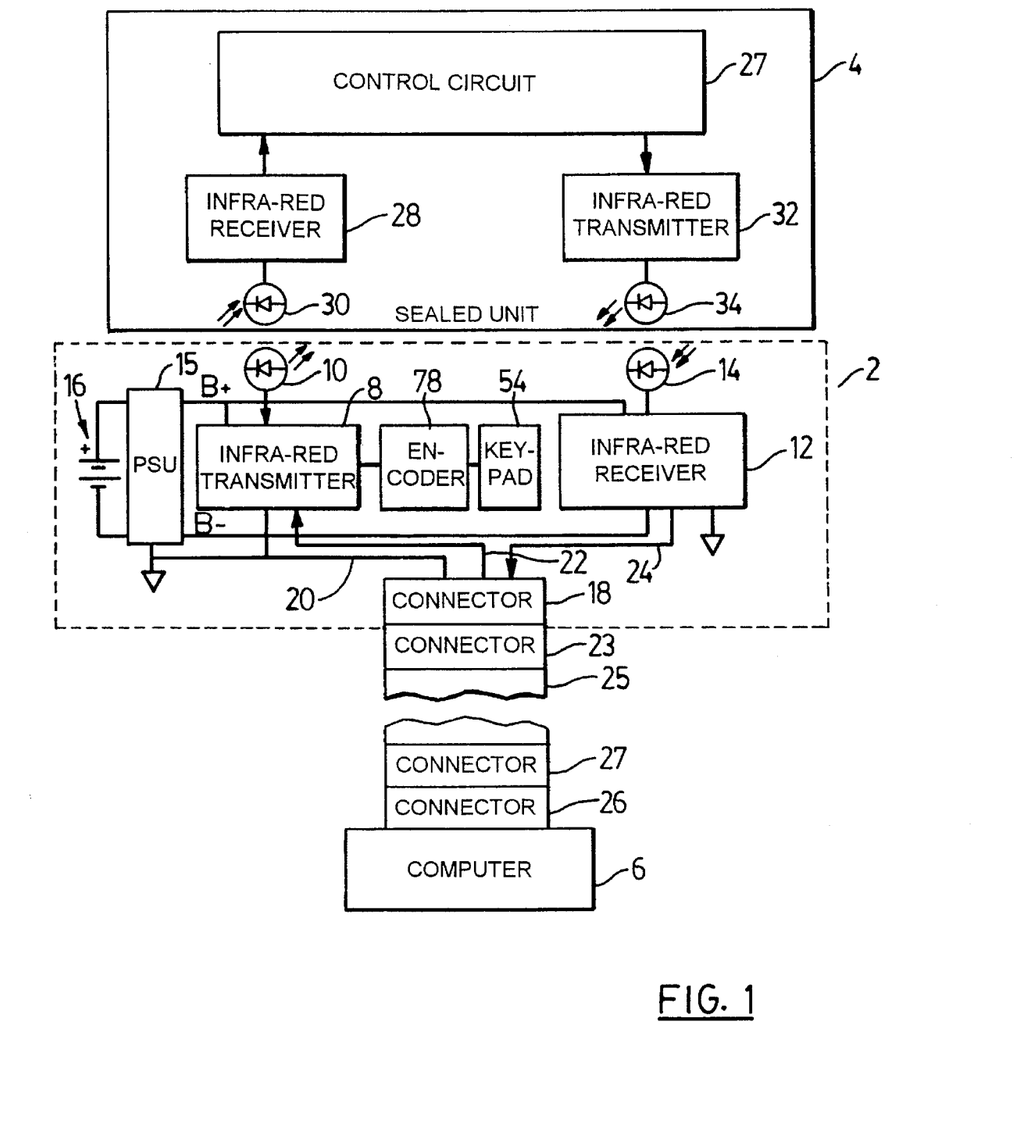
FIG. 1 is a schematic block diagram of a battery powered interface unit forming a modem in accordance with one embodiment of the invention, shown providing a communications link between enclosed electronic equipment and a computer.

Referring to FIG. 1, a battery powered interface unit 2 provides a modem which forms an interface between a personal computer 76 and a communications link into or from enclosed electronic equipment 4. The present invention is ideally suited for use with enclosed electronic equipment 4 which is contained in a tamperproof or environmentally sealed casing operating in an adverse environment, for example, acoustic ranging devices manufactured by Milltronics Ltd. which incorporate the invention of U.S. Pat. No. 4,821,215. While current models support only one way communication as described in that patent, forthcoming models will support two way communication between the equipment 4 and the interface unit 2, utilizing separate infra-red links of defined geometry.

The interface unit 2 described below provides a modem interfacing between an infra-red or other radiation communications link through a case of the enclosed electronic equipment 4 and the computer 6. Whilst the presently described embodiments utilizes an infra-red link through the equipment causing the invention herein disclosed may also be implemented using a link effected by visible or other electromagnetic radiation as an alternative to infrared radiation, provided that appropriate transducers, transmitters and receivers are employed, and that at least relevant parts of the enclosure 60 (see FIGS. 3 and 4) of the equipment 4 or its lid 62 are transparent to the radiation utilized. Ultrasonic radiation could be used provided that transducers capable of handling appropriate frequencies were utilized: the capabilities of available low cost transducers operating at around 40 kHz are likely to be inadequate to support acceptable serial data rates.

The interface unit 2 includes a first infra-red transmitter 8 with an associated infrared emitting diode 10 and a first infra-red receiver 12 with an associated infra-red sensor diode 14, which form the actual communications interface. The infra-red transmitter 8 and receiver 12 are powered by a power supply 15 having a positive, negative and ground terminals and powered by a battery 16. The ground terminal of the power supply 15 is connected to a signal ground pin 20 of a first RS232 serial connector 18, having also a transmitted data pin 22 and a received data pin 24. The transmitted data pin 22 provides the digital signal voltage to be transmitted to the infra-red transmitter 8 from the computer 6. The received data pin 24 receives a digital voltage signal from the infra-red receiver 12. The transmitter 8 is also shown as receiving data from an encoding circuit 78 receiving signals from a keypad 54. In practice, the interface unit may either include the keypad and encoder circuit as well as the modem, as shown, or the keyboard and encoder may be omitted, and incorporated into a separate unit similar to that described in U.S. Pat. No. 4,821,215, which may be docked as described below in place of the interface unit.

The RS232 (revision C) standard specifies a logic level 0 as represented by any voltage between +3 and +15 volts and a logic level 1 as represented by any voltage between −3 and −15 volts. The power supply 15 is configured to ensure that the voltage level of the signal received on the received data pin 24 is within the specified RS232 tolerance, thereby eliminating the necessity for level shifting the digital voltage signal provided by the first infra-red receiver 12.

The first RS232 connector 18 is connected to a second RS232 connector 26, associated with a digital serial interface integral with the computer 6. The connection between the RS232 connectors 18 and 26 can be achieved by the use of a flexible cable 25 having at either end an RS232 connector 23 and 27 complementary to the first 18 and second 26 RS232 connectors, respectively. The length of the flexible cable 25 can be chosen to permit the computer 6 to be operated outside of the immediate vicinity of the infra-red link into the enclosed electronic equipment 4.

In an alternative embodiment, the first serial connector 18 may be connected at the end of a flexible cable connected integrally to the interface unit 2. Again, the length of the flexible cable can be chosen so as to permit the computer 6 to be operated outside of the immediate vicinity of the enclosed electronic equipment 4. In this case, an additional cable would only be needed in the event that an extension was required to the integral cable.

The enclosed electronic equipment 4 includes control circuitry 27 implementing the functions performed by the particular unit, for example those described in U.S. Pat. No. 4,821,215, and connected thereto is a second infrared receiver 28 with an associated infrared sensor diode 30. The infrared sensor diode 30 can receive data, either modulated or unmodulated, over an optical link from the infra-red source diode 10. The control circuitry 27 also has connected thereto through a serial interface, a second infra-red transmitter 32 with an associated infra-red emitting diode 34. The infra-red emitting diode 34 is modulated transmit data, either directly or by keying a continuous wave carrier or other technique providing improved noise immunity, to be received by sensor diode 14 over a second optical link. Although the invention is most useful with equipment having both transmitting and receiving capabilities, it may also be used with units which have only one of these capabilities. The receiver 28 and the receiver 32 in the equipment may advantageously be implemented by circuits the same as those used to implement the receiver 12 and the transmitter 8, described below with reference to FIGS. 3 and 2 respectively.

Figure 2:
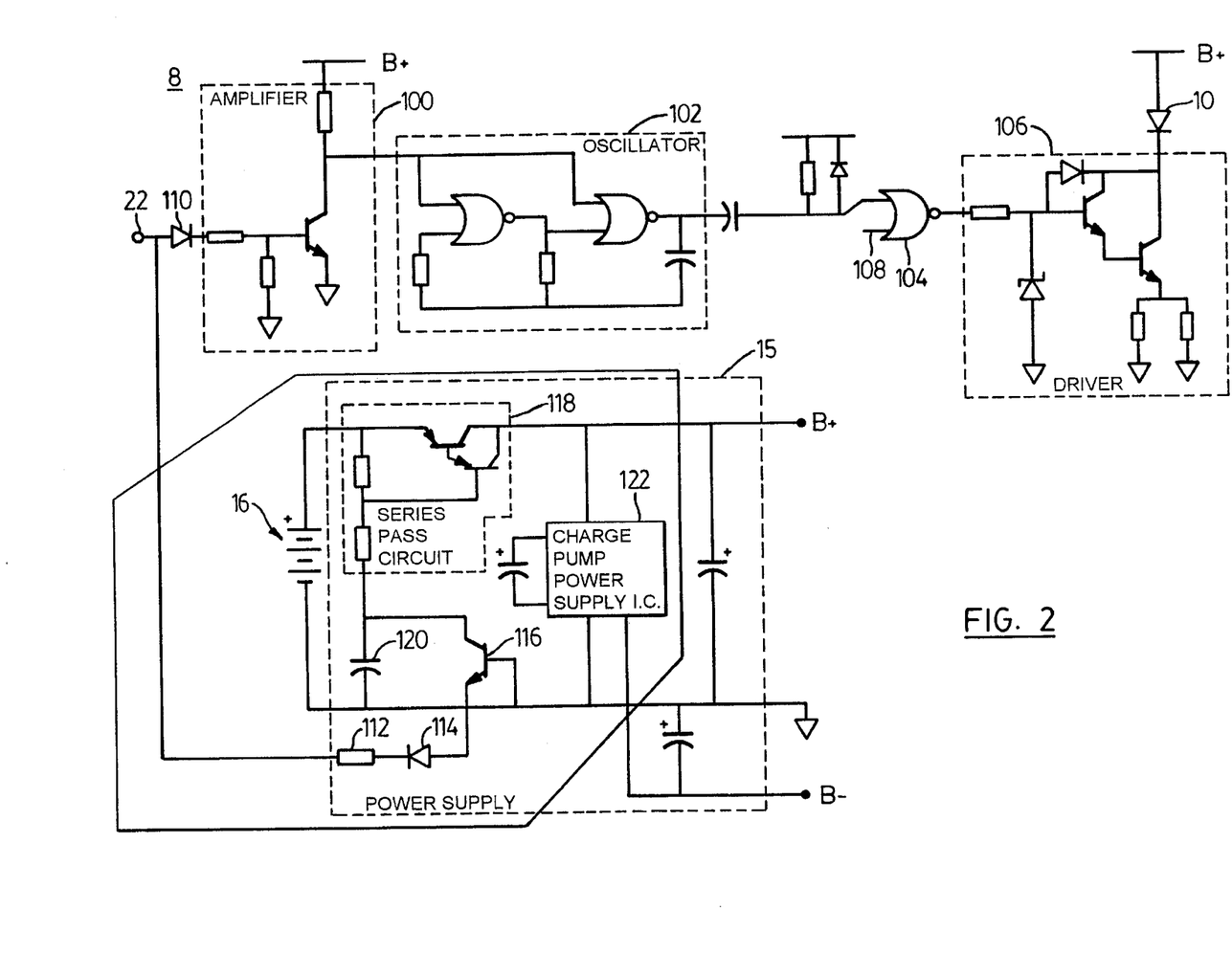
FIG. 2 is a schematic circuit diagram of a transmitter incorporated in the circuit of FIG. 1.

FIG. 2 shows a schematic diagram of the transmitter 8, including its associated infra-red emitting diode 10. A signal from the pin 22 is applied to a limiting amplifier stage 100 which keys an oscillator 102 formed by two NOR gates and associated components and operating at about 375 kHz, the oscillator output being applied through a first input of a NOR gate 104 to a driver circuit 106 driving the diode 10. A second input 108 of the NOR gate 104 receives an input from the keypad encoder circuit 78 (see FIG. 1) if present, in this example produced by keying of a lower frequency of about 40 kHz, otherwise it is strapped to the first input.

In the absence of an input connection from a computer to the pin 22, that pin will be clamped to a potential near zero by the action of a diode 110 and the base bias circuit of the amplifier 100, and by the resistor 112, the rectifier diode 114 and the emitter diode of a transistor 116 in the power supply 15 with the result that the latter will remain turned off. This in turn maintains a series pass circuit 118 between the battery 16 and the remainder of the power supply in a turned off condition. If a computer is connected to the unit through an RS232 compliant serial port, the pin 22 will in a rest condition be held by the computer at a negative potential of at least 3 volts, sufficient to turn on the transistor 116 and activate the power supply. When signals are passing to the modem at the pin 22, its potential will alternate between negative and positive, but the capacitor 120 will store sufficient charge rectified by diode 114 to maintain the series pass circuit in an on condition for the duration of any positive transitions which may occur during the normal transmission of data.

The power supply 15 further includes a charge pump power supply integrated circuit 122, for example of type LTC 1044, providing a negative potential B− utilized in the receiver 12 in addition to the positive potential B+ provided by the circuit 118. Since the power supply is thus only active when the RS232 port 18 is connected to the RS232 port of a computer, no on/off switch is required for the unit, which will draw no current when not connected to an active RS232 port.

If a similar transmitter is used to implement the transmitter 32, the functions of the power supply are already implemented within the equipment 4; it may be omitted or left unconnected.

Figure 3:
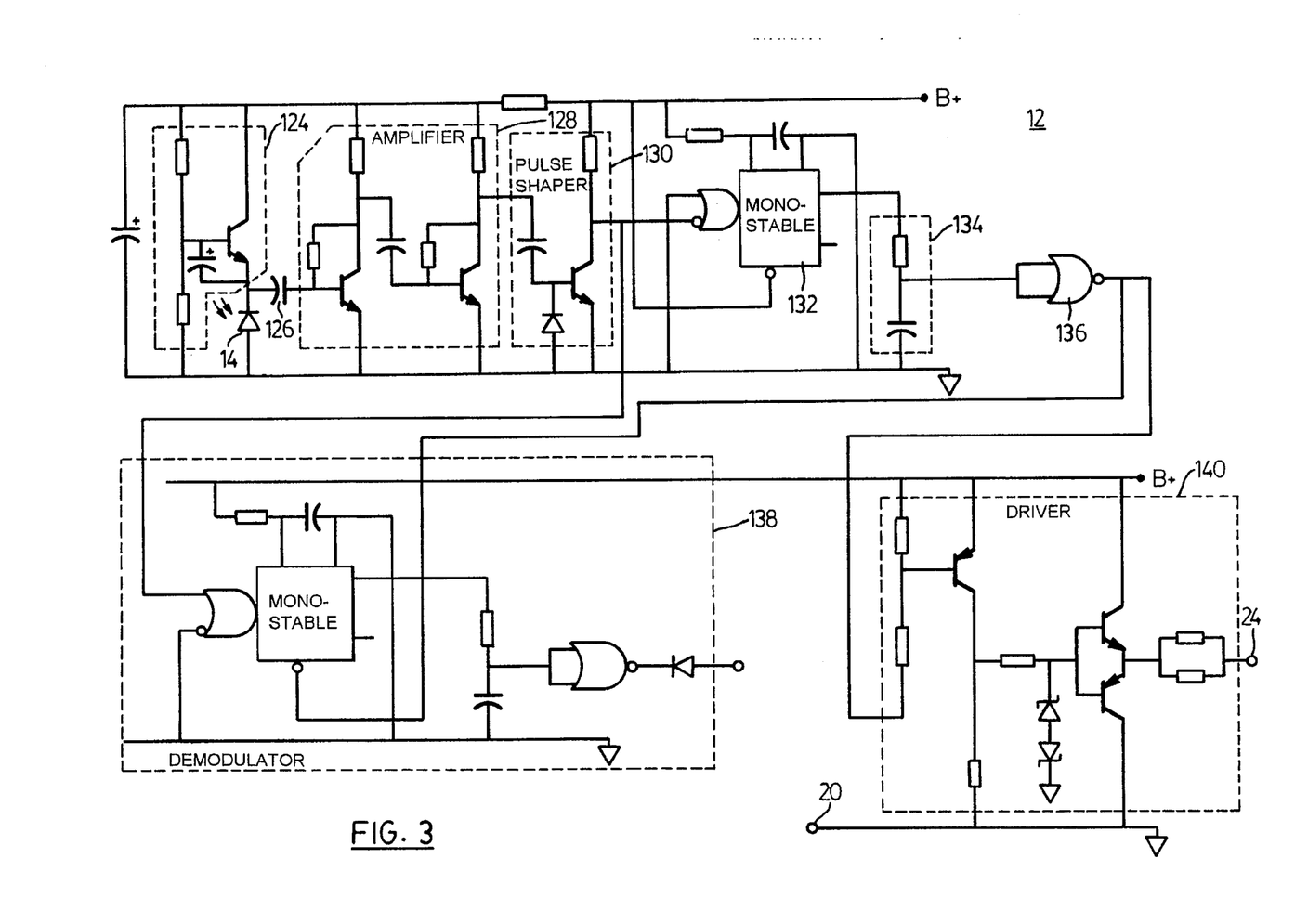
FIG. 3 is a schematic circuit diagram of a receiver incorporated in the circuit of FIG. 2.

FIG. 3 shows a schematic diagram of the receiver 12 including the infra-red receiving diode 14. The diode 14 is connected in series with the emitter of a transistor incorporated in a circuit 124 which compensates for differing levels of ambient light which may reach the diode 14 in addition to wanted signals. The circuit acts to provide a regulated supply to the diode which presents very low impedance maintaining a substantially constant potential across the diode responsive to relatively slow ambient light level changes, but presents a relatively much higher impedance responsive to very rapid light level changes such as those produced by high frequency signals such that the latter will produce significant changes in potential across the diode. These are transferred by the low value coupling capacitor 126 to an amplifier 128 and pulse shaping circuit 130 providing pulses, the trailing edges of which are used to trigger a retriggerable monostable multivibrator 132, typically implemented using a 4538 integrated circuit and RC components selected to provide a period of about 4 ms. An integrator circuit 134 and a gate connected as a buffer 136 act in conjunction with the monostable multivibrator to demodulate signals keyed at a frequency high enough that sufficient potential can be developed across the integrator to turn on the buffer. This frequency should be sufficiently below the frequency of the oscillator 102 to enable the integrator circuit 134 to respond quickly, but sufficiently high to exclude unwanted signals.

For example, if the same receiver is utilized for the receiver 28, it should be capable of excluding and separating signals originating from the keypad from RS232 signals originating from a computer connected to the unit. Whilst the latter, in the example described, are modulated by keying a 375 kHz continuous wave, the former will typically be modulated by keying a 40 kHz (approximately) continuous wave. Such keypad signals can be demodulated by providing an additional circuit 138 incorporating a monostable multivibrator, integrator and buffer similar to that already described, but using time constants about 10 times greater. This additional circuit is disabled by an output from the buffer 136 whilst RS232 signals are being received. The circuit 138 performs no function in the receiver 12 and need not be implemented if a similar receiver is not to be used to implement the receiver 28.

The signal from the buffer 136 is amplified and level shifted by a driver circuit 140 to provide an RS232 compliant output signal connected to pin 24 if the receiver 12 is being implemented, or an RS232 input terminal within the equipment 4 if the receiver 32 is being implemented.

Figure 4:
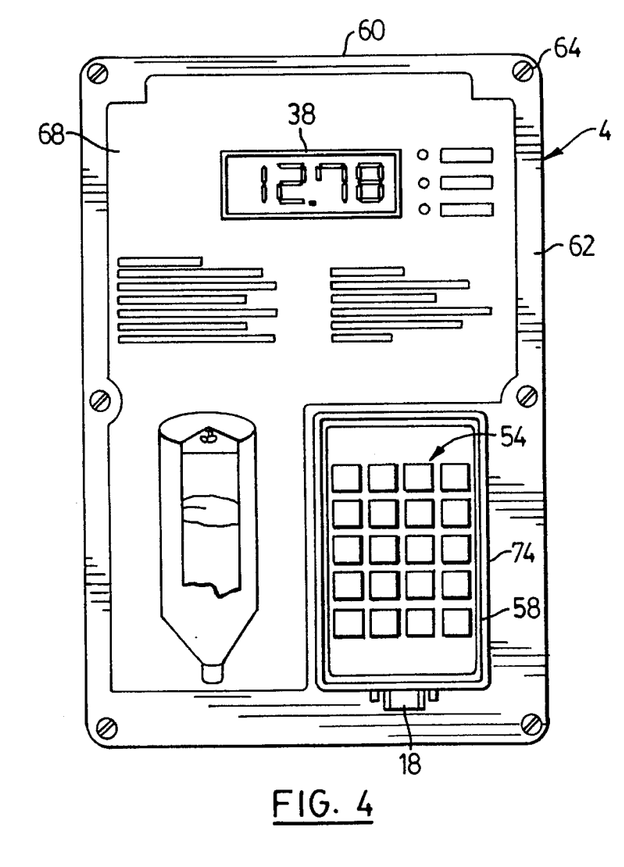
FIG. 4 is a diagrammatic front view illustrating the interaction of the interface unit and the enclosed electronic equipment.
Figure 5:
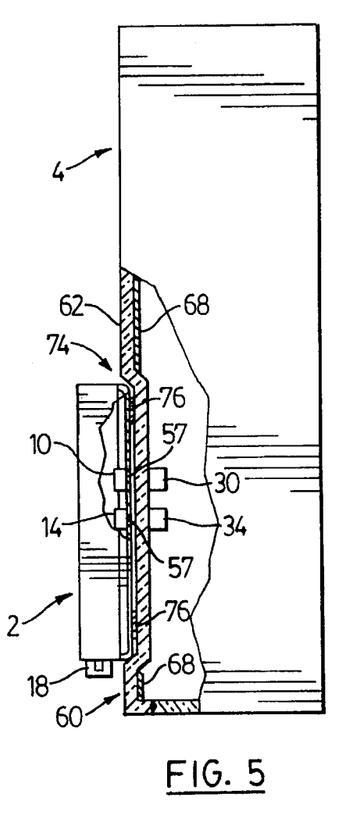
FIG. 5 is a sectional side view, partly broken away, of the units shown in FIG. 4.

Referring to FIGS. 4 and 5, a typical embodiment of equipment 4 is shown, in conjunction with the interface 2, which in this case incorporates the keypad 54 as well as the modem, although as discussed this is an optional feature. The equipment 4 and keypad are generally similar in material respects to those disclosed in U.S. Pat. No. 4,821,215 except for incorporation of the modem components shown and described with reference to FIGS. 1, 2 and 3.

The unit 2, is designed to be portable and to have a portion dockable in a recess 74 in the enclosed electronic equipment 4. The unit 2 is preferably enclosed in an environmentally sealed casing 58. The enclosed electronic equipment 4 is enclosed in an environmentally sealed casing 60, or other casing which is locked or to which access is not readily available, and the infra-red optical links are established through this casing.

Referring to FIG. 5, the diodes 10 and 14 are each mounted behind a window 57, integrally formed with the casing 58 of the interface unit 2. The diodes 30 and 34 are also each mounted behind a window formed by a portion of a transparent lid 62 of the casing 60 of the enclosed electronic equipment 4 which is not provided with an opaque backing 68. The windows are of material transparent to the radiation transmitted between the diodes 10 and 30, and 14 and 34. The pairs 10, 30 and 14, 34 of diodes are sufficiently physically separated that, with the unit 2 in the position shown, there is minimal cross-talk between the optical links connecting the diode pairs.

The interface unit 2 can be releasably retained in place so that part of it enters recess 74, using magnetic strips 76 in the same manner as described in U.S. Pat. No. 4,821,215 with respect to a keypad unit. When the interface unit 2 is docked in the recess, the windows align so that two optical paths are formed: one path between diodes 30 and 10, and another path between diodes 14 and 34. However, it will be understood that it is not essential to the invention that the interface unit 2 itself be releasably retained in a recess in the enclosed electronic equipment 4: for example the windows 38 could be replaced by separate optical fibres in an optical cable, a far end of which is received in a socket in the unit 4 so as to complete optical paths between the fibres and the windows 39. If alternative forms of radiation were used to establish the links, then alternative forms of window or waveguide would be appropriate, which must be effective to prevent significant cross-talk between the channels by controlling the geometry of the optical paths.

Figure 6:
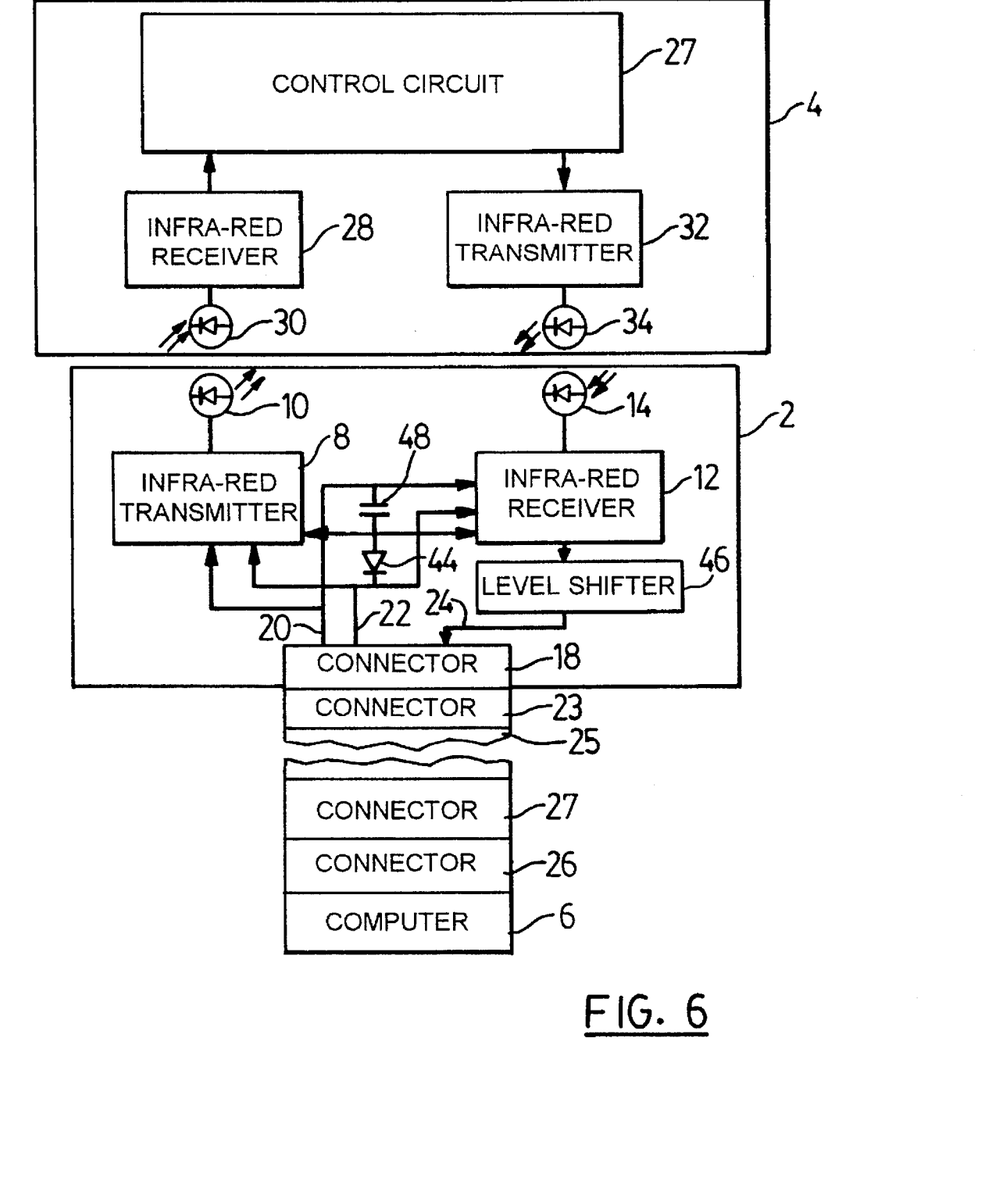
FIG. 6 is a schematic block diagram of a self-powered interface unit forming a modem in accordance with a second embodiment of the invention, shown providing a communications link between enclosed electronic equipment and a computer.

A second preferred embodiment of the present invention is shown in FIG. 6. For clarity and to facilitate description, those elements common to both FIG. 1 and FIG. 4 have retained the same numbering.

The embodiment shown in FIG. 4 differs from the embodiment described previously and shown in FIG. 1 in that the power supply for the embodiment is obtained from the computer 6 through the serial connector 26 rather than from a separate battery. An advantage in the use of the computer 6 as the power supply is that the interface unit 2 does not then require that provision be made for the replacement or charging of the battery. This embodiment preserves the integrity of the unit 2 and contributes to its portability by reducing its overall weight and size.

An additional advantage to the embodiment shown in FIG. 4 is that the computer 6, unlike the battery, does not require periodic testing to ensure that adequate power is available to power the interface unit 2. However, the power available from the serial interface of a personal computer is limited, and may vary widely according to the implementation of that interface. Moreover, additional circuitry is required in order to implement the interface unit 2. The power available from a battery, on the other hand, can be substantially greater than that available from a portable computer. Such greater power may be desirable to enable a sufficient output from the transmitter 8 to maintain reliable, noise-immune communication over the infra-red links.

The power source in FIG. 6 is derived from the second RS232 serial connector 26, in conjunction with the computer 6. In the embodiment shown in FIG. 4, the signal ground pin 20 is used as the positive voltage supply to the transmitter 8 and receiver 12 and the transmitted data pin 22 is connected to a common supply to the transmitter 8 and receiver 12 through a diode 44, so that when the transmit pin is in its rest state, typically at −9 volts, a 9 volt supply is available to the transmitter and receiver. The supply is maintained during transmit pulses by a reservoir capacitor 48. A level shifter 46 is provided at the output of the receiver 12 in order to ensure that the voltage level of the received signal conforms to the specifications of the serial interface. Conveniently the transmitter 8 is implemented as a keyed oscillator which is turned on either during or between transmit pulses to generate burst of oscillation used to modulate the diode 10, while the receiver 12 comprises a tuned amplifier followed by a demodulator and limiting amplifier. The arrangement in which the oscillator is turned on between transmit pulses is preferred, since it then provides a reference signal which can be detected by the receiver 28 to verify the presence of a link, and which can also be used as an input to an automatic gain control loop used to control the sensitivity of the receiver.

The RS232 serial interface is described with reference to the above preferred embodiments as an example only. Any industry standard bidirectional serial interface either conforming with a standard within the RS232 series, for example revision C or D, or other standard, such as the RS422, RS423 or RS530, could be used to implement the present invention. The RS422 standard for example is implemented in the Macintosh (trademark) computer, and its implementation might be appropriate for use with that brand of computer.

While the invention has been described with reference to particular embodiments, it will be obvious to one skilled in the art that such particular embodiments may be varied without departing from the spirit and scope of the invention, which is as set out in the appended claims.

In one modification, a bezel 38 of a window for viewing a display of the electronic equipment 4 (see FIG. 4) is used to dock the interface unit 2, since the computer connected through the interface will provide an alternative display. In this case, the diodes 30 and 34 will of course be relocated behind the display window, and the recess 74 may be omitted.

I claim:

1. A modem for establishing communication between electronic process control equipment capable of serial data communication, and a personal computer equipped with a standardized general purpose serial data communications port connector, the process control equipment being enclosed within a casing and provided with a serial communications interface implemented by transmission of modulated electromagnetic radiation through a portion of the casing transparent to such radiation, the modem including a serial communications interface implemented by transmission of modulated electromagnetic radiation and complementary to that of the process control equipment, wherein the modem has a portion configured to be physically interengaged with a complementarily configured portion of the casing of the process control equipment to provide at least one enclosed radiation path, of geometry defined by the interengagement of the portions between the modem and the equipment, and wherein the interface unit further comprises means for establishing plug-in communication with the standardized general purpose serial data communications port of the personal computer, said communication establishing means comprising a serial port connector complementary to that of the computer, means for modulating electrical signals received from the complementary serial port connector to produce modulated electromagnetic radiation for transmission by said complementary serial communications interface, and means for demodulating modulated electromagnetic radiation received by said complementary interface to provide electrical signals for application to said complementary serial port connector.

2. A modem according to claim 1, wherein the electromagnetic radiation is infra-red radiation.

3. A modem according to claim 1, wherein the means for modulating electrical signals to produce electromagnetic radiation includes a keyed oscillator having a frequency much higher than a highest bit rate to be employed by said serial communications interface and serial port connector of the modem.

4. A modem according to claim 1, wherein the serial communications interface of the modem comprises physically separate means for transmitting and receiving radiation, and the configuration of the interengagable portion of the modem is such as to establish separate enclosed radiation paths to and from the equipment without significant crosstalk between them.

5. A modem according to claim 4, which further includes a keypad and a keypad encoder and wherein the means for transmitting radiation to said enclosed electronic equipment is also used to transmit signals from said keypad encoder.

6. A modem according to claim 5, wherein the signals from said keypad encoder have a carrier frequency much lower than a carrier frequency utilized by said modem for modulating data from the electronic process control equipment.

7. A modem according to claim 1, including a battery and a power supply providing power from said battery to said modem, which includes a circuit responding to connection of the complementary serial port connector to a serial port connector of a computer to turn on said power supply.

8. A modem according to claim 7, wherein the response circuit includes a rectifier rectifying a negative potential appearing on a transmit pin of said complementary port, and a switching transistor turned on by an output of said rectifier stored by a capacitor.

* * * * *